United States Patent
Pandit et al.

(10) Patent No.: US 9,944,271 B2
(45) Date of Patent: Apr. 17, 2018

(54) RETROFIT SYSTEM FOR CONVERTING A VEHICLE INTO ONE OF A HYBRID ELECTRIC VEHICLE AND ELECTRIC VEHICLE

(71) Applicant: KPIT Technologies LTD., Pune (IN)

(72) Inventors: S. B. Ravi Pandit, Pune (IN); Tejas Krishna Kshatriya, Pune (IN); Isheet Madhukant Patel, Pune (IN)

(73) Assignee: KPIT TECHNOLOGIES LTD., Pune (IN)

( * ) Notice: Subject to any disclaimer, the term of this patent is extended or adjusted under 35 U.S.C. 154(b) by 0 days.

(21) Appl. No.: 14/915,142

(22) PCT Filed: Sep. 1, 2014

(86) PCT No.: PCT/IN2014/000569
§ 371 (c)(1),
(2) Date: Feb. 26, 2016

(87) PCT Pub. No.: WO2015/029075
PCT Pub. Date: Mar. 5, 2015

(65) Prior Publication Data
US 2016/0207522 A1 Jul. 21, 2016

(30) Foreign Application Priority Data

Aug. 29, 2013 (IN) .................. 2328/MUM/2013

(51) Int. Cl.
*B60W 10/08* (2006.01)
*B60W 20/14* (2016.01)
(Continued)

(52) U.S. Cl.
CPC .......... *B60W 20/14* (2016.01); *B60K 6/26* (2013.01); *B60K 6/36* (2013.01); *B60K 6/40* (2013.01);
(Continued)

(58) Field of Classification Search
USPC .......................................................... 701/22
See application file for complete search history.

(56) References Cited

U.S. PATENT DOCUMENTS 4,689,527 A * 8/1987 Wu ................. B30B 15/148
318/45
8,004,219 B2 * 8/2011 Mattson ................ B60K 6/46
180/65.21
(Continued)

OTHER PUBLICATIONS

International Search Report regarding Application No. PCT/IN2014/000569 dated Mar. 9, 2015.

*Primary Examiner* — Richard A Goldman
(74) *Attorney, Agent, or Firm* — Foley & Lardner LLP

(57) ABSTRACT

The present invention provides a retrofit system for configuring a vehicle into a hybrid electric vehicle or electric vehicle. The system comprises an electric power source (EPS) comprising one or more motors to provide fail safe torque to the vehicle and harness braking energy for charging one or more batteries, one or more attachable electric power gear assemblies (EPGA) configured to couple the one or more motors to a propeller shaft for providing the torque to the vehicle, and an electronic control unit coupled to the electric power source (EPS) for dynamically controlling functioning of the one or more motors based on the running conditions to drive the vehicle. The system comprises of a motor controller to control functioning of one or more motors. The motor controller actuates one or more motors based on the torque and power required to drive the vehicle.

20 Claims, 12 Drawing Sheets

(51) Int. Cl.
*B60K 6/40* (2007.10)
*B60K 6/48* (2007.10)
*B60K 6/26* (2007.10)
*B60K 6/36* (2007.10)
*B60W 10/06* (2006.01)
*B60W 10/18* (2012.01)
*B60W 20/20* (2016.01)
*B60W 50/04* (2006.01)

(52) U.S. Cl.
CPC .............. *B60K 6/48* (2013.01); *B60W 10/06* (2013.01); *B60W 10/08* (2013.01); *B60W 10/18* (2013.01); *B60W 20/20* (2013.01); *B60W 50/045* (2013.01); *B60K 2006/4808* (2013.01); *B60K 2006/4833* (2013.01); *B60W 2050/046* (2013.01); *B60W 2510/12* (2013.01); *B60W 2510/244* (2013.01); *B60W 2520/10* (2013.01); *B60W 2560/00* (2013.01); *B60W 2710/083* (2013.01); *B60Y 2200/92* (2013.01); *Y02T 10/626* (2013.01); *Y02T 10/6221* (2013.01); *Y02T 10/7258* (2013.01); *Y10S 903/906* (2013.01); *Y10S 903/909* (2013.01); *Y10S 903/93* (2013.01); *Y10S 903/951* (2013.01)

(56) References Cited

U.S. PATENT DOCUMENTS

| | | | |
|---|---|---|---|
| 2002/0084120 A1* | 7/2002 | Beasley | B60K 6/36 180/65.25 |
| 2009/0223725 A1* | 9/2009 | Rodriguez | B60K 6/40 180/65.21 |
| 2011/0172837 A1* | 7/2011 | Forbes, Jr. | G06Q 10/00 700/291 |
| 2014/0303824 A1* | 10/2014 | Ozaki | B60L 7/18 701/22 |

* cited by examiner

RETROFIT SYSTEM FOR CONVERTING A VEHICLE INTO ONE OF A HYBRID ELECTRIC VEHICLE AND ELECTRIC VEHICLE

CROSS-REFERENCE TO RELATED APPLICATIONS

The present application is a national stage application of PCT Application No. PCT/IN2014/000569, filed Sep. 1, 2014, which in turn claims priority to Indian Application No. 2328/MUM/2013, filed Aug. 29, 2013, which is incorporated herein by reference in its entirety.

FIELD OF THE INVENTION

The present invention generally relates to hybrid electric vehicle, and more particularly relates to a system for converting a vehicle into a hybrid electric vehicle or electric vehicle.

BACKGROUND OF THE INVENTION

The hybrid electric vehicle (HEV) and the electric vehicle (EV) are currently experiencing a growing demand due to the growing lack of fossil fuels and due to carbon dioxide emissions from exhaust in conventional internal engine vehicles. EVs purely utilize an electric drive motor which is run on electric energy stored in the battery to power the vehicle. HEVs utilize an internal combustion engine and/or electric drive motor to power the vehicle. Hybrid vehicles generally achieve fuel economies which constitute a 25-40% improvement over the conventional internal combustion engine powered vehicles.

Currently the concept of the HEVs/EVs is applied to heavy duty vehicles such as public transport buses. Consider that a public transport bus (electric or hybrid electric bus) with a gross vehicle weight (GVW) of 16 ton typically covers around 200 kilometers in a day's trip in the city. Assuming that the average time the bus spends at a bus stop is around a minute. Also, consider distance between two bus stops that the bus travels in the city route is between 2 km to 5 km. In order to fulfill the above mentioned requirements, the electric or hybrid electric bus, typically, would require a battery to last at least for 200 km for city use. Accordingly, the electric/hybrid bus requires a large battery pack in the range of 200 kwh which may significantly add to the operating cost.

Also, use of a single motor to drive the bus requires a large size motor and heavy weight. Further, a heavy single motor, the higher inertia causes a response lag. Even a single large motor is not able to optimize the battery consumption. Additionally, a multistage gear box needs to be employed to achieve higher speeds.

Therefore, there is a need for a system having one or more motors for converting a vehicle into a hybrid electric vehicle and/or an electric vehicle. The system of the present invention, having multiple motors enables to optimize battery consumption by operating one or more motors according to the torque required to propel the vehicle.

SUMMARY

An embodiment of the present invention describes a retrofit system for converting a vehicle into one of a hybrid electric vehicle and an electric vehicle. With the system of the present invention, an existing vehicle can be converted to a mild hybrid, a full hybrid, a complete electric vehicle, an electric vehicle with higher capacity motor and a heavy duty electric vehicle. Thus, with the system of the present invention an existing vehicle can be converted into different ranges of hybrid and electric vehicles, according to the requirement, without much modification to the existing vehicle assembly. The system comprises of an electric power source (EPS) comprising one or more motors to provide fail safe torque to the vehicle and harness braking energy for charging one or more batteries, one or more attachable electric power gear assemblies (EPGA) configured to couple the one or more motors to a propeller shaft for providing the torque to the vehicle, and an electronic control unit coupled to the electric power source (EPS) for dynamically controlling functioning of the one or more motors based on running conditions to drive the vehicle.

In one embodiment, one or more attachable electric power gear assemblies are configured to connect one or more electric power sources in at least one of a perpendicular position and a parallel position, to a propeller shaft. The electronic control unit (ECU) is configured to control and provide power to the vehicle subsystem which includes but is not limited to the air condition system, vacuum brake system and air brake system. One or more sensors include, but are not limited to, throttle sensor, brake sensor, and speed sensor, for providing one or more signals to the electronic control unit (ECU). An engine management system (EMS) controls a vehicle engine by taking throttle input which includes, but not limited to, vehicle speed, exhaust gases, engine temperature, and acceleration. Global system for mobile (GSM) communication transmits information related to the vehicle to a web server, thereby enabling the web server to monitor the working condition of the vehicle and location of the vehicle. One or more motor controllers controlled by the electronic control unit, provide the logic to determine which motor is to be operated and what amount of power is to be extracted in order to provide required torque at every operating point of the vehicle.

Another embodiment of the present invention describes a hybrid electric vehicle. The vehicle comprises of two or more wheels for propelling the vehicle on receiving a torque through a propeller shaft, an electric power source (EPS) comprising one or more motors to provide fail safe torque to the vehicle and harness braking energy for charging one or more batteries, one or more attachable electric power gear assemblies (EPGA) configured to couple the one or more motors to a propeller shaft for providing the torque to the vehicle, an electronic control unit coupled to the electric power source (EPS) for dynamically controlling functioning of the one or more motors based on running conditions to drive the vehicle, and one or more batteries for providing electric energy to an electric power source (EPS) and one or more electrical equipments configured with the vehicle, said one or more batteries being charged when the electric power source (EPS) is operating as a generator, wherein the one or more attachable electric power gear assembly is configured to connect one or more electric power sources in at least one of a perpendicular position and a parallel position, to the propeller shaft.

Yet another embodiment of the present invention describes an electric vehicle. The electric vehicle comprises two or more wheels for propelling the vehicle on receiving a torque through a propeller shaft, an electric power source (EPS) comprising one or more motors to provide fail safe torque to the vehicle and harness braking energy for charging one or more batteries, one or more attachable electric power gear assemblies (EPGA) configured to couple the one or more motors to a propeller shaft for providing the torque to the vehicle, an electronic control unit coupled to the electric power source (EPS) for dynamically controlling functioning of the one or more motors based on running conditions to drive the vehicle, and one or more batteries for providing electric energy to an electric power source (EPS) and one or more electrical equipment configured with the vehicle, said one or more batteries being charged when the electric power source (EPS) operating as a generator, wherein the one or more attachable electric power gear assemblies are configured to connect one or more electric power sources in at least one of a perpendicular position and a parallel position, to a propeller shaft.

BRIEF DESCRIPTION OF THE ACCOMPANYING DRAWINGS

The aforementioned aspects and other features of the present invention will be explained in the following description, taken in conjunction with the accompanying drawings, wherein.

DETAILED DESCRIPTION OF THE INVENTION

Figure 1:
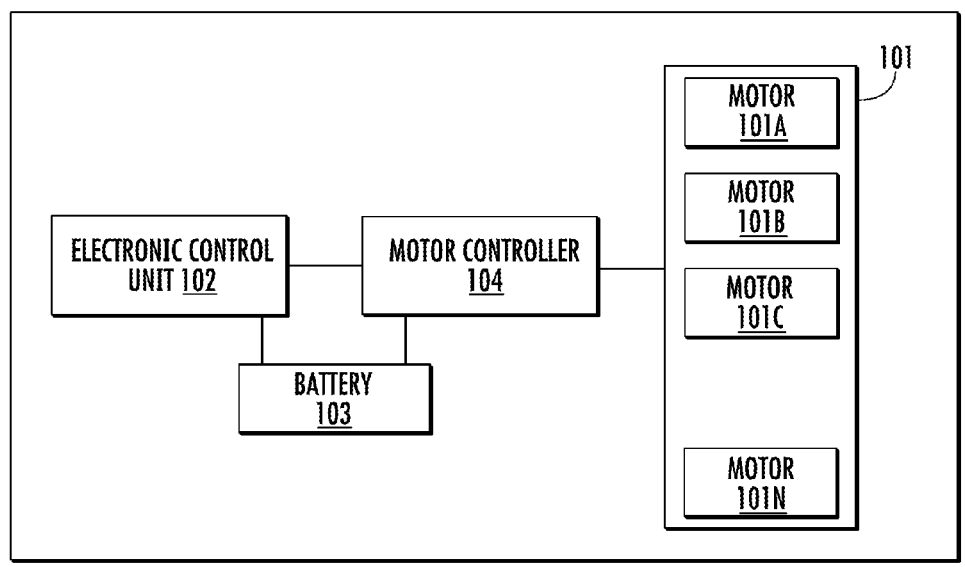
FIG. 1 illustrates a block diagram of a retrofit system for converting vehicle into either hybrid electric vehicle or electric vehicle (EV), according to one embodiment of the present invention.

The embodiments of the present invention will now be described in detail with reference to the accompanying drawings. However, the present invention is not limited to the present embodiments. The size, shape, position, number and the composition of various elements of the device of the invention is exemplary only and various modifications are possible to a person skilled in the art without departing from the scope of the invention. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention describes a system for converting a vehicle into a hybrid electric vehicle or an electric vehicle. The system comprises multiple electric power sources against single big capacity electric power source to optimize the power consumption and harness the braking energy. Additionally, the system has a fail-safe feature combined with high availability i.e. due to multiple motors, failure of one motor will not hamper the whole system. The system also provides better heat dissipation requiring no forced cooling, better starting torque, and quicker response as a big single motor will have slower response due to inertia lag as opposed to smaller multiple motors which will not have this limitation. Depending upon the exact torque requirement of the vehicle at any given point in time, appropriate number of motors would be operated by the control logic of the system. This will ensure that the motors are always operated in their best efficiency zone. In addition, the system is capable of remote monitoring, diagnostics and remote control.

FIG. 1 illustrates a block diagram of a retrofit system 100 for configuring a vehicle into a Hybrid electric vehicle, according to one embodiment of the present invention. The system 100 comprises an electric power source (EPS) 101, one or more electric power gear assemblies (EPGA) (not shown in FIG. 1), an electronic control unit 102, and a battery pack 103. The electric power source (EPS) 101 comprises one or more motors 101A-101N to provide fail safe torque to the vehicle and harness braking energy for charging one or more batteries. The one or more electric power gear assemblies (EPGA) have attachable design for coupling the one or more motors to at least one propeller shaft for providing the torque to the vehicle. The electronic control unit 102 is coupled to the electric power source (EPS) 101. The electronic control unit (ECU) comprises at least one of the control logic that dynamically controls the functioning of one or more motors based on torque requirements and running conditions to drive the vehicle. The battery pack 103 includes one or more batteries and may be adapted to store electric energy in the form of chemical energy. The battery pack 103 is charged from a direct alternating current (AC) power source. In an exemplary embodiment, the battery pack 103 is charged using a pantograph type burst charger. In another exemplary embodiment, the battery pack 102 is charged using a charging outpost stationed in parking areas. The electric power source (EPS) 101 may comprise of any type of suitable motor known in the art, but preferably a poly-phase motor.

The battery pack 103 provides electric energy to the motor controller 104 for driving one or more motors 101A-101N. The control logic of the motor controller 104 controls functioning of the multiple motors 101A-101N. In some embodiments, the motor controller 104 actuates one or more motors 101A-101N based on the amount of torque and power required to drive the vehicle. For example, the motor controller 104 actuates all the motors to move the vehicle from a standstill position and subsequently one or more motors of the 101A-101N are cut off as per torque and power requirement. Accordingly, the motors 101A-101N provides power to the wheels to run the hybrid/electric vehicle. The motors 101A-101N can be connected through gears or couplings, or any other methods known in the art, to the wheels. It can be noted that, the number of motors 101A-101N employed in the vehicle may depend on amount of torque and power requirements at maximum load, the type of vehicle, the terrain and the vehicle usage. Also, the multiple motors 101A-101N helps achieve a quicker power response due to the low inertia of each motor. Moreover, failure of one of the motor does not affect the operation of the vehicle.

Figure 2:
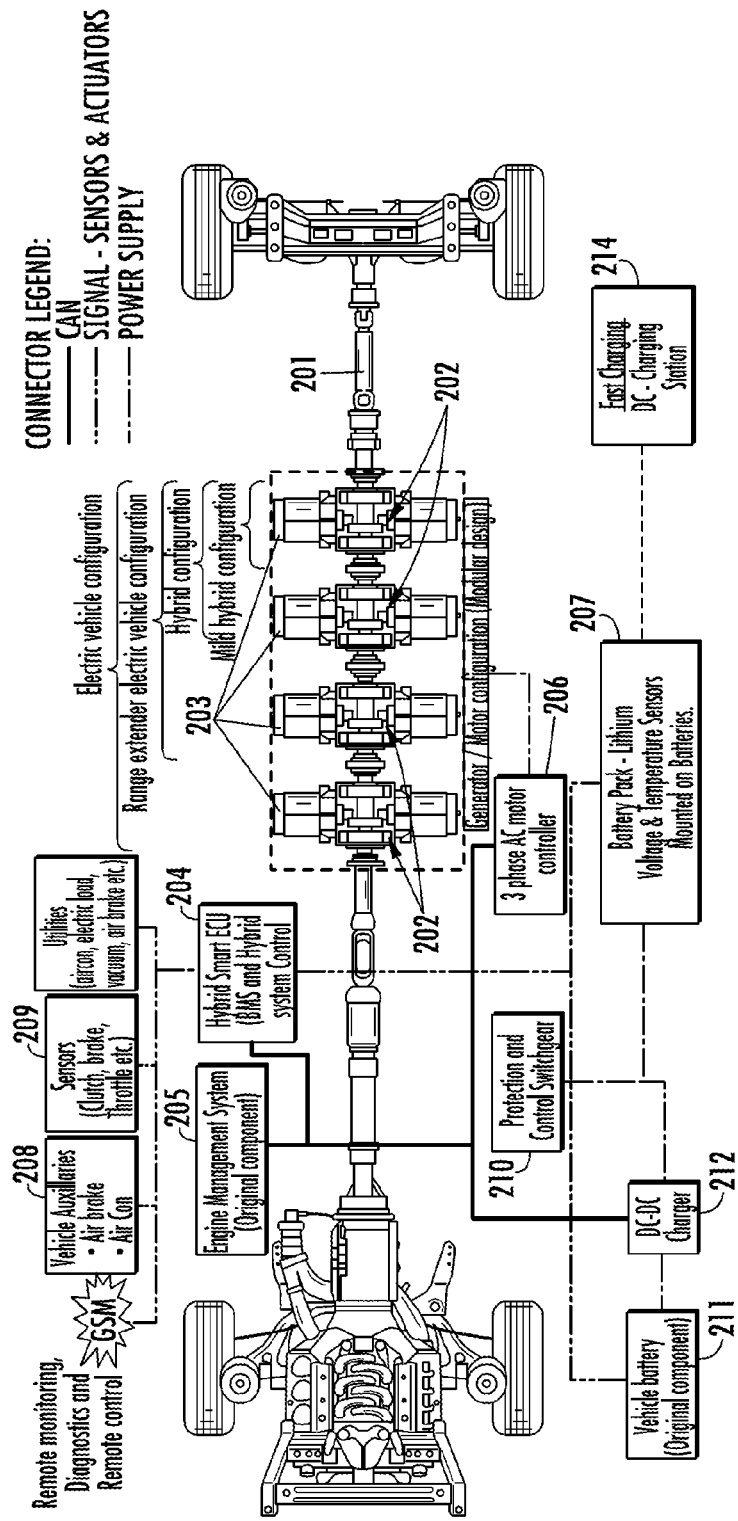
FIG. 2 illustrates system architecture for different configurations, according to an embodiment of the present invention.

FIG. 2 illustrates system architecture for different configurations according to an embodiment of the present invention. The hybrid electric vehicle or electric vehicle includes a retrofit system 100. The vehicle comprises two pairs of wheels, a shaft 201 for providing torque to the pair of wheels, an engine for providing torque to the pair of wheels through the shaft 201, one or more motors 203 coupled to the shaft 201 using one or more electric power gear assemblies (EPGA) 202, an electronic control unit 204, an engine management system (EMS) 205, one or more 3 phase AC motor controllers 206, and a battery pack 207.

The engine management system (EMS) controls the engine by taking throttle input from driver, speed, exhaust gases, engine temperature, acceleration, and other parameters, all depending upon the user demand. From this throttle input, the EMS calculates the amount of power required and controls the supply of fuel to the engine to provide the required power.

The electronic control unit (ECU) 204 is connected to the engine management system (EMS) 205 for providing one or more instruction in accordance with the predefined configuration. The vehicle also includes battery management system (BMS) which can be inbuilt in the electronic control unit or can be configured outside the electronic control unit (ECU) 204 and is controlled by the electronic control unit (ECU) 204. The battery management system monitors the battery voltage, current and temperature for each battery.

The 3 phase AC motor controller 206 is configured to drive the one or more motors and is being controlled by the electronic control unit (ECU) 204. The control logic of the motor controller 206 of the ECU 204 provides instructions to the one or more motors for providing torque at one or more operating point based on predefined parameters and predefined instructions.

The vehicle additionally includes vehicle auxiliaries 208, one or more sensors 209, protection and control switch gear unit 210, vehicle battery 211, DC-DC charger 212, fast charging unit 214, controller area network (CAN), Global System for Mobile Communications (GSM). The sensors include, but are not limited to, throttle sensor, brake sensor, and speed sensor.

The vehicle auxiliaries 208 comprise one or more power (battery) consuming systems such as an air conditioning system, or a vacuum or air brake system. Now, when a vehicle runs in the EV mode, these elements will need control and power. The ECU comprises of the required control logic to run these devices according to the vehicle condition and provide power and control as per the need.

Protection and control switch gear unit 210 provides protection against any short circuit, over current and over voltage which may damage the system.

Additionally, the vehicle may have one or more smaller capacity batteries 211 to run the vehicle electric loads such as, but not limited to, wipers, head lamps, horn, music system. The DC-DC charger 212 charges the vehicle battery 211 by converting voltage from the battery pack to a voltage required by the vehicle battery.

In range extender or EV vehicle configuration, the larger battery pack is required for driving the vehicle and this will be charged externally through a fast charging station. This is outside the vehicle shown by dotted line. Whenever vehicle gets an opportunity to stop, it can fast charge the battery pack in less than 15 minutes.

The controller area network (CAN) configured in the vehicle enables the microcontrollers and other communicating devices to communicate with each other within the vehicle. GSM is a telematics device for transmitting the information from the ECU to a web server to monitor the health and location of the vehicle. It has a diagnostics algorithm which can determine or detect the potential faults and failures in the vehicle beforehand.

Figure 3:
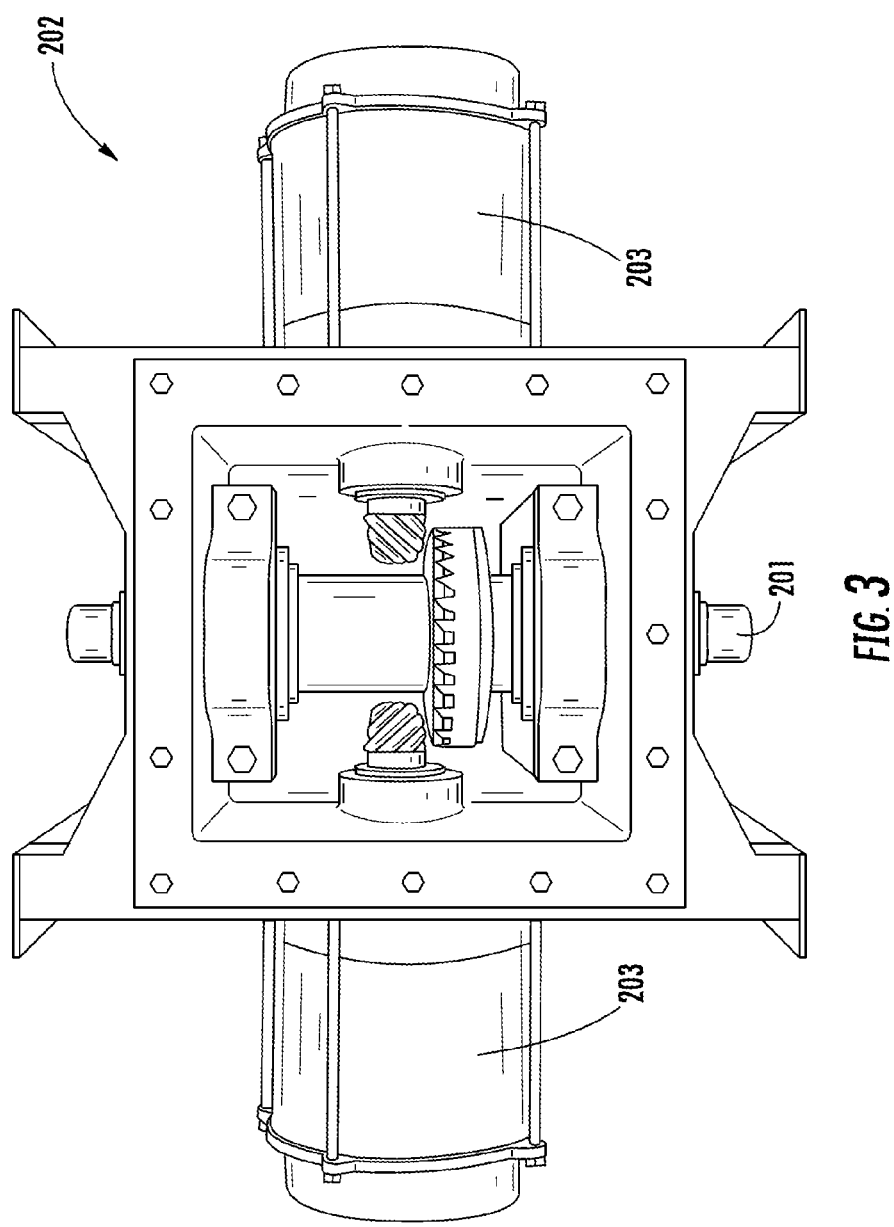
FIG. 3 illustrates a pictorial representation of an electric power gear assembly (EPGA) according to an embodiment of the present invention.

FIG. 3 illustrates a pictorial representation of an electric power gear assembly (EPGA) according to an embodiment of the present invention. FIG. 3 shows two motors connected to the shaft through a gear assembly. Each motor has one pinion connected to crown, which is mounted on the shaft. With this arrangement, motor's power is transmitted perpendicularly.

Figure 4:
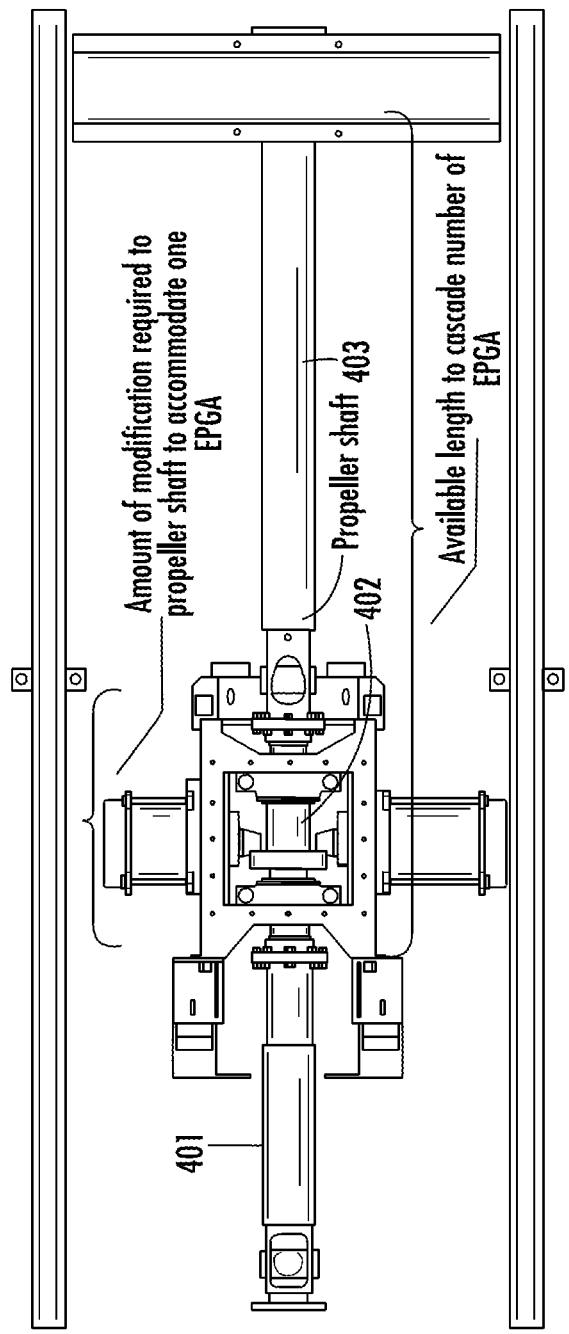
FIG. 4 illustrates a pictorial representation of integration of an electric power gear assembly (EPGA) with the vehicle chassis according to another embodiment of the present invention.

FIG. 4 illustrates a pictorial representation of integration of an electric power gear assembly (EPGA) with the vehicle chassis according to another embodiment of the present invention. FIG. 4 shows three sections of propeller shafts: front 401 connected to engine (taking engine vibrations), center 402 attached to chassis and rear 403 connected to differential (taking road vibrations). EPGA is attached to the center shaft which is the most stable shaft due to the attachment to the chassis. In view of this, the length of the central portion of the propeller shaft is the governing point which determines the number of EPGAs that can be cascaded in a vehicle.

In one embodiment of the invention, in order to increase the power with a shorter shaft length, the EPSs length or diameter can be increased to obtain more power out of same EPGA casing design.

Figure 5:
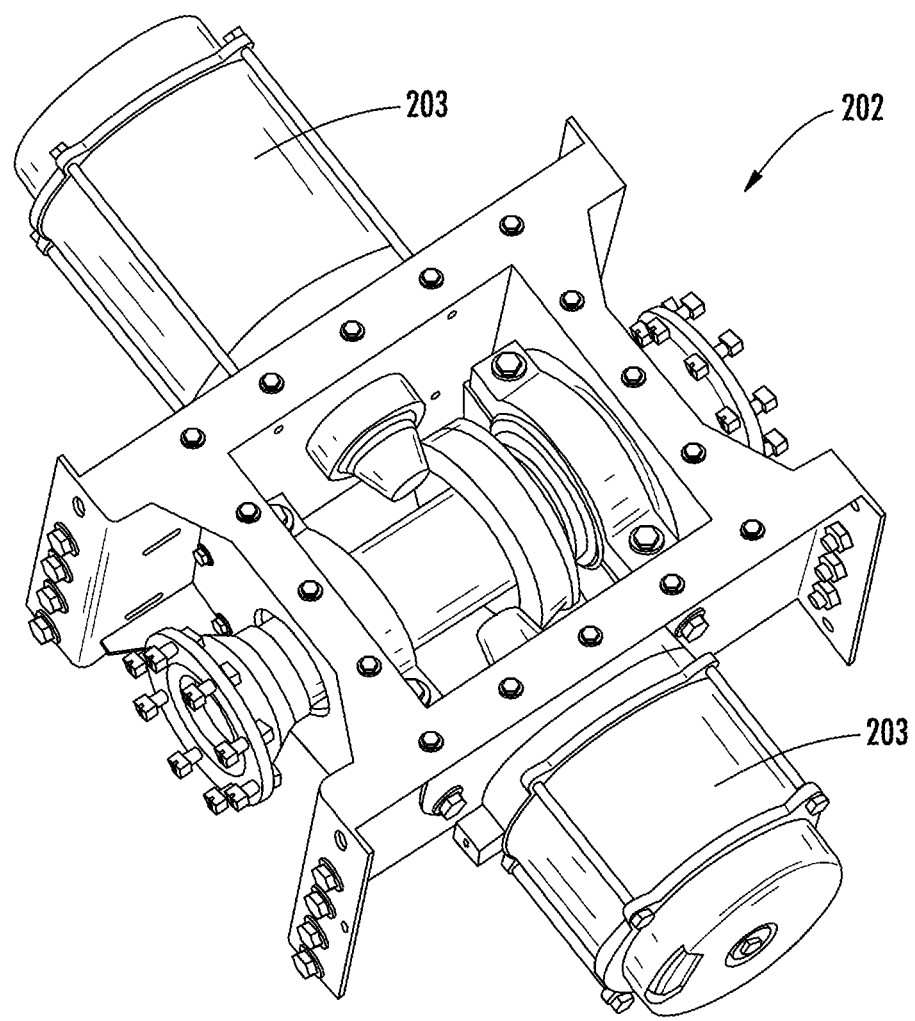
FIG. 5 illustrates a pictorial representation of an electric power gear assembly (EPGA) casing and assembly according to an embodiment of the present invention.

FIG. 5 illustrates a pictorial representation of an electric power gear assembly (EPGA) casing and assembly, according to an embodiment of the present invention. In this figure, the two motors of different lengths are attached to the EPGA (as disclosed in FIGS. 3 and 4) to extract variable amount of power.

In one embodiment, the EPSs used in the system have different characteristics as mentioned below:
1. Different poles—e.g.
    8 pole motor can be used during launch of the vehicle for better starting torque with high efficiency— motoring and regeneration, both
    4 OR 6 pole motor can be used for mid-range operation
    2 pole can be used for high speed operation
All the motors attached to a vehicle using the EPGA can be used for special driving requirements such as, steep hill climb, sudden braking, sudden acceleration, to overtake the vehicle, etc. without up shifting the gear.
2. Different power rating depending upon the operating speeds of the motor. For example, low power rating for low speed high torque motor and vice versa.
3. Different sizes of EPSs depending upon the operation duty cycle. E.g. under city conditions the EPS will tend to heat up due to high duty cycle therefore the de-rating of this motor of EPS will have to be higher.

According to one embodiment, the equation to calculate the rated torque of one EPS is given below:

$$\text{Torque required at differential} = \frac{\text{Torque required at wheels}}{\text{Differential ratio}}$$

$$\text{Torque required at } EPGA = \frac{\text{Torque required at differential}}{EPGA \text{ ratio}}$$

$$\text{Torque required from One } EPS = \frac{\text{Torque required at } EPGA}{\text{Number of } EPS's}$$

$$\text{Rated torque of One } EPS = \frac{\text{Torque required from One } EPS}{\text{Peak torque factor}}$$

For example, if the torque required at wheel is 20,000 Newton Meters in a vehicle having differential ratio of 6 and EPGA ratio of 5 with 2 EPSs having peak torque factor of 2, then the rated torque of One ESP required is 167 Newton Meters using above mentioned equation.

EPGA configurations:

The EPGA configuration of the invention is a complete modular configuration. Due to this modular design, it is possible to connect multiple electric power sources together through various arrangements. Some of these arrangements have been discussed below in detail. In EPGA, all the EPSs which are perpendicular to a propeller shaft are connected through a hypoid profiled crown and pinion gears arrangements which is commonly used in differential. However, it is possible to use any type of gear which can transmit power perpendicularly, instead of the hypoid profiled crown and the pinion gears, such as simple bevel gears. It is to be noted that the below mentioned EPGA configurations are illustrative only and multiple combinations of the configurations are possible depending on the vehicle requirement. For example, any number of motors may be used which may be arranged in any combination of configurations, all in perpendicular, all in parallel, any combination of parallel and perpendicular arrangement and any combinations thereof. Additionally, a motor with any length and power and multiple motors with any combinations thereof, may be used as per the requirement.

FIGS. 6-12 illustrate various configurations of electric power gear assembly (EPGA) and assembly using different number of electric power sources (EPSs) in different alignments.

Figure 6:
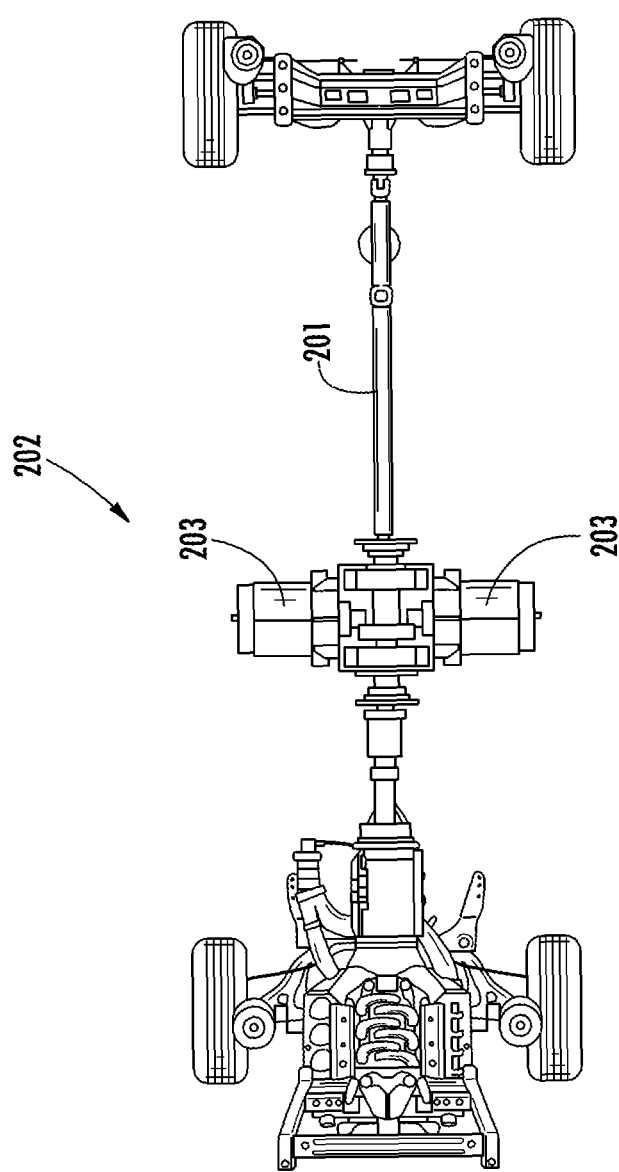
FIG. 6 illustrates a configuration of electric power gear assembly (EPGA) according to an embodiment of the present invention.

FIG. 6 illustrates a configuration of electric power gear assembly (EPGA) according to an embodiment of the present invention. In this embodiment, two electric power sources (EPSs) are connected perpendicular to a propeller shaft through EPGA having hypoid profiled crown and pinion gear arrangement which is commonly used in differential.

Consider an arrangement which has three propeller shafts joined through universal joints. Now, to accommodate this arrangement, a center propeller shaft is cut to accommodate the EPGA. This smaller capacity system is suitable for medium hybrid electric vehicle (MHEV).

The system comprises following components at high level:

| # | Description | Quantity |
|---|---|---|
| 1 | Electric power sources | 2 |
| 2 | Crown wheel | 1 |
| 3 | Pinion | 2 |
| 4 | EPGA casing | 1 |

Figure 7:
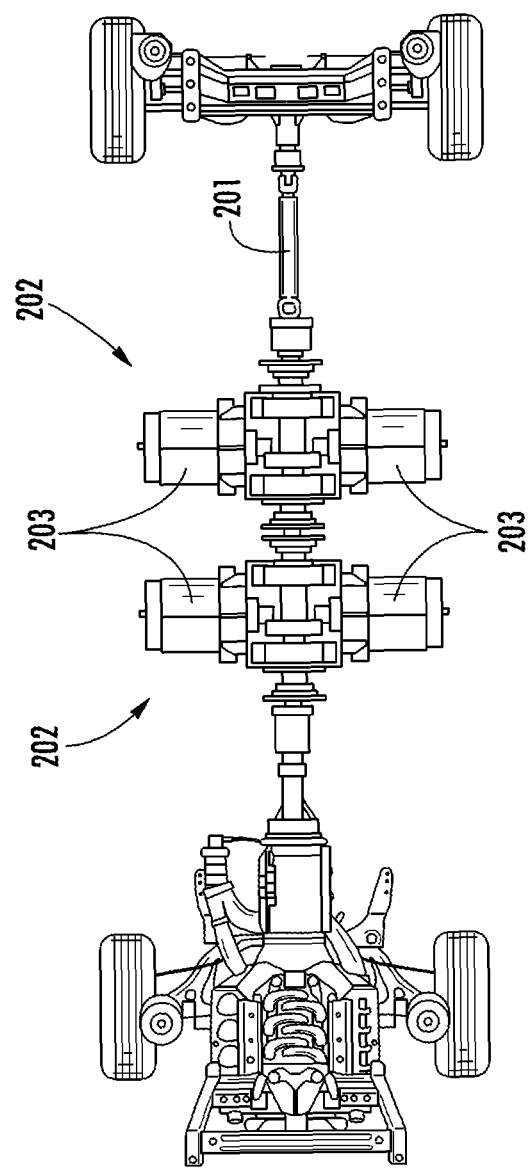
FIG. 7 illustrates a configuration of electric power gear assembly (EPGA according to another embodiment of the present invention.

FIG. 7 illustrates a configuration of electric power gear assembly (EPGA) according to an embodiment of the present invention. In this embodiment, four EPSs are connected perpendicular to a propeller shaft through EPGA having hypoid profiled crown and pinion gear arrangement which is commonly used in a differential.

Consider an arrangement which has three propeller shafts joined through universal joints. Now, to accommodate this arrangement, a center propeller shaft is cut to accommodate 2 EPGAs. This higher capacity system is suitable for full hybrid electric vehicle (FullHEV).

The system comprises following components at high level:

| # | Description | Quantity |
|---|---|---|
| 1 | Electric power sources | 4 |
| 2 | Crown wheel | 2 |
| 3 | Pinion | 4 |
| 4 | EPGA casing | 2 |

Figure 8:
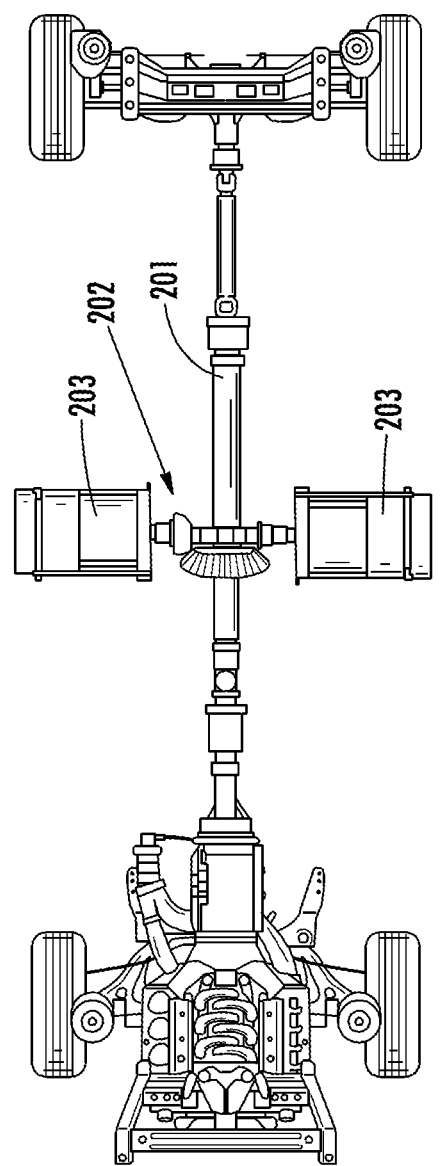
FIG. 8 illustrates a configuration of electric power gear assembly (EPGA) according to yet another embodiment of the present invention.

FIG. 8 illustrates a configuration of electric power gear assembly (EPGA) according to an embodiment of the present invention. In this embodiment, two EPSs are connected perpendicular to a propeller shaft through the EPGA having hypoid profiled crown and pinion gear arrangement which is commonly used in differential.

The embodiment described in FIG. 8 includes only one pinion whereas the embodiment described in FIG. 6 includes two pinions. This is achieved by modifying one pinion face to accommodate integration of direct shaft from second EPS. The integration is done through splines or flange arrangement.

In one embodiment, an EPS is divided into left and right part and connected through one single shaft at the middle. The shaft at the middle has gear arrangement to connect to the crown wheel on the propeller shaft.

Consider an arrangement which has three propeller shafts joined through universal joints. Now, to accommodate this arrangement, a center propeller shaft is cut to accommodate the EPGA. This smaller capacity system is suitable for MHEV.

The system comprises following components at high level:

| # | Description | Quantity |
|---|---|---|
| 1 | Electric power sources | 2 |
| 2 | Crown wheel | 1 |
| 3 | Pinion | 1 |
| 4 | EPGA casing | 1 |

Figure 9:
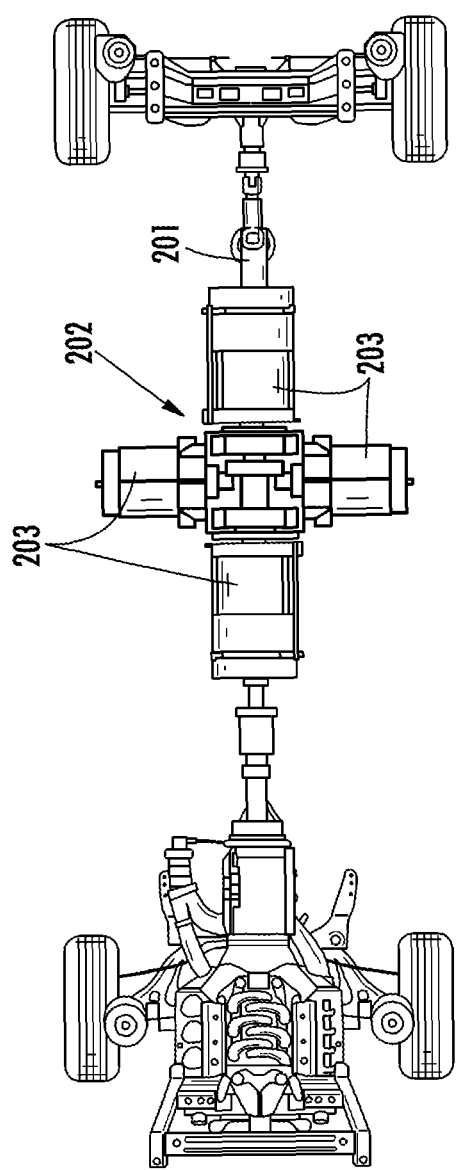
FIG. 9 illustrates a configuration of electric power gear assembly (EPGA) according to further embodiment of the present invention.

FIG. 9 illustrates a configuration of electric power gear assembly (EPGA) according to an embodiment of the present invention. In this embodiment, four EPSs are connected to a propeller shaft out of which two are perpendicular and the other two are parallel to the propeller shaft. Two EPSs are connected to the propeller shaft through EPGA's crown and pinion gear arrangement and another two EPSs are connected parallel to the propeller shaft with little modification to the EPS design.

Figure 10:
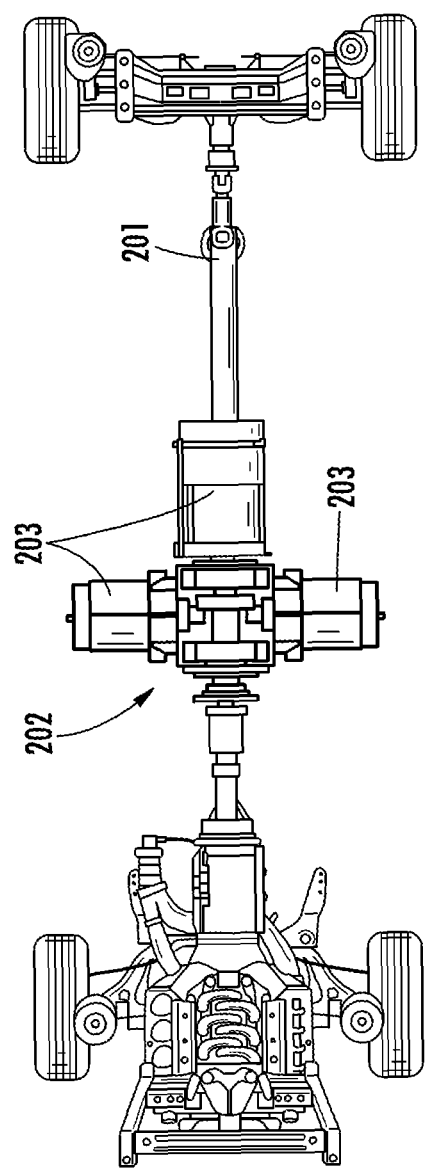
FIG. 10 illustrates a configuration of electric power gear assembly (EPGA) according to further embodiment of the present invention.

FIG. 10 illustrates a configuration of electric power gear assembly (EPGA) according to an embodiment of the present invention. In this embodiment, three EPSs are connected to the propeller shaft through universal joints, out of which two are perpendicular and the third one is parallel to the propeller shaft. Now, to accommodate this arrangement, a center propeller shaft is cut to accommodate one EPS.

The configurations described in FIG. 9 and FIG. 10 are higher capacity systems and suitable for FullHEV.

The system comprises following components at high level:

| # | Description | Quantity |
|---|---|---|
| 1 | Electric power sources | 3 OR 4 |
| 2 | Crown wheel | 1 |
| 3 | Pinion | 2 |
| 4 | EPGA casing | 1 |

Figure 11:
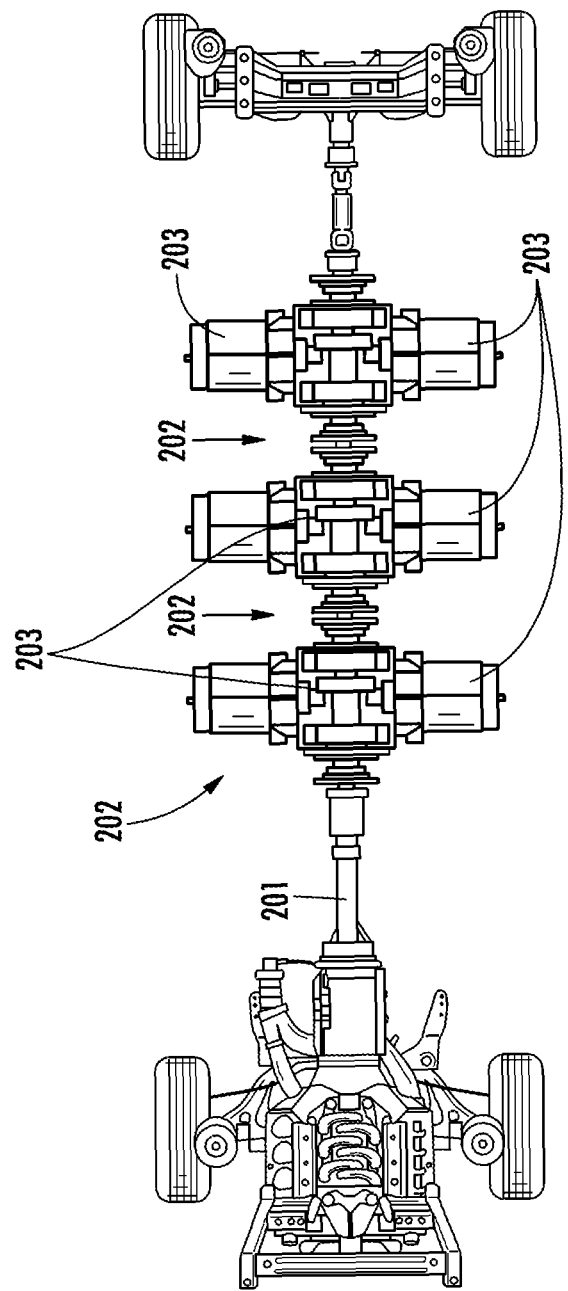
FIG. 11 illustrates a configuration of electric power gear assembly (EPGA) according to further embodiment of the present invention.

FIG. 11 illustrates a configuration of electric power gear assembly (EPGA) according to an embodiment of the present invention. In this embodiment, six EPSs are connected to the propeller shaft through cascading of three EPGAs. The EPGA has hypoid profiled crown and pinion gear arrangement which is commonly used in a differential.

Consider an arrangement which has three propeller shafts joined through universal joints. Now, to accommodate this arrangement, a center propeller shaft is cut to accommodate 3 EPGAs. The three EPGAs, having modular design, are cascaded together. This extremely high capacity system is suitable for FullHEV with smaller capacity EPSs, and with higher EPSs for tipper such as trucks.

The system has following components at high level:

| # | Description | Quantity |
|---|---|---|
| 1 | Electric power sources | 6 |
| 2 | Crown wheel | 3 |
| 3 | Pinion | 3 OR 6 |
| 4 | EPGA casing | 3 |

Figure 12:
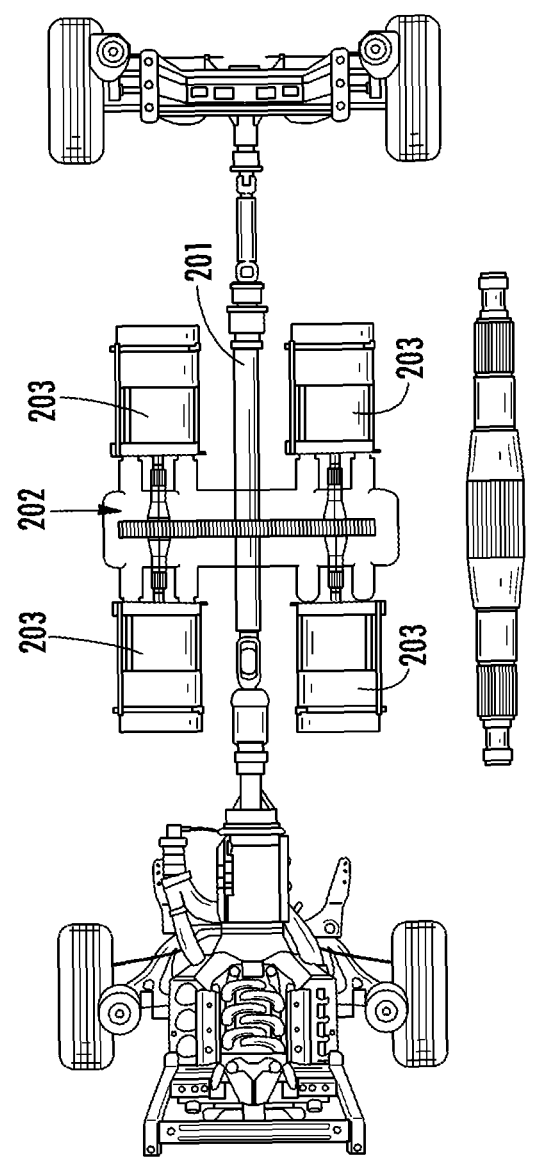
FIG. 12 illustrates a configuration of electric power gear assembly (EPGA) according to further embodiment of the present invention.

FIG. 12 illustrates a configuration of electric power gear assembly (EPGA) according to an embodiment of the present invention.

In this embodiment, four EPSs are connected parallel to the propeller shaft through a modified EPGA. Here, more than 60% of the components of configuration discussed above are retained, while making it possible to mount EPSs in parallel.

In the modified design, spur or helical type of gearing is suitable for transmitting the power. This high capacity system is suitable for FullHEV or EV.

The system comprises following components at high level:

| # | Description | Quantity |
|---|---|---|
| 1 | Electric power sources | 4 |
| 2 | Drive gears | 2 |
| 3 | Driven gears | 1 |
| 4 | EPGA casing | 1 |

System Configurations:

The EPGA's modular design configurations illustrated above in FIGS. 6 to 12 provide flexibility to have various system configurations as described below. It is to be noted that although, each of the configuration described above, from FIG. 6 to FIG. 12, provide the number of components required for different ranges of hybrid electric vehicle and electric vehicle, it is to be noted that the numbers are exemplary only. For example, a full EV may be designed, by using only two EPSs of greater length and higher capacity and changing the number of other components required, accordingly. Thus, the number of EPSs and other components can be arranged in different combinations to make it suitable to the type and range of hybrid vehicle or electric vehicle that an existing vehicle needs to be converted to The system configuration and the ECU control logic for different ranges of hybrid electric vehicle and electric vehicle, according to the present invention is described below.

System Configuration 1: Plug-in Hybrid Electric Vehicle

According to an embodiment, the Plug-in Hybrid electric Vehicle (PHEV) comprises EPSs, EPGAs, a battery bank, electronic control unit and polyphase controller with one or more invertors and/or chargers. The vehicle can run up to a mid-range speed like 40 kmph in electric vehicle (EV) mode, beyond this it will operate as a Hybrid vehicle.

Table 1 below shows various exemplary components and the respective quantity required for this configuration.

TABLE 1

| PHEV components | |
|---|---|
| Component | Quantity |
| Multi-Motor System | |
| Poly phase motor | 4 |
| Poly phase motor controller | 4 |
| Motor Integration in the vehicle chassis | 1 |
| Energy storage device | |
| Energy storage device with cell monitoring | 1 |
| Energy management system | 1 |
| Energy storage system integration | 1 |
| Charger | 1 |

TABLE 1-continued

PHEV components

| Component | Quantity |
|---|---|
| Electric Power systems | |
| Electric power gear assembly (EPGA) | 2 |
| Hybrid ECU with Telematics | 1 |
| Wire harness and protection switchgear | |
| Harness | 1 |
| Protection + switchgear | 1 |
| HMI (Mode, Diagnostics, Trips, GPS) | 1 |

In one embodiment, the vehicle operation is divided to reach certain speed in different categories such as launch (0 to 20 kmph), Acceleration, Cruise, Deceleration, Momentum and Braking.

For example, starting from zero speed with a fully loaded or under overload condition, all the motors may provide torque with engine in the off state providing complete electric launch and zero pollution. Subsequently, the motors will be cut off and engine will provide the power as per the need. Table 2 shows various indicative modes of operation of engine and one or more motors, according to a state of vehicle.

The energy storage system capacity will not be high in this configuration but it will be top-up charged at regular intervals in addition to opportunity basis during deceleration and braking. This significantly reduces the cost of solution as battery capacity is reduced. It also improves the efficiency of the system as dead weight is reduced. In case the energy storage system is not charged, the vehicle can be operated on the engine and the system can be operated as a mild hybrid electric vehicle by utilizing the regenerated brake energy.

TABLE 2

Motor operating modes

| Vehicle State | Engine | Motor 1 | Motor 2 | Motor 3 | Motor 4 |
|---|---|---|---|---|---|
| Standstill | ☐ | ☐ | ☐ | ☐ | ☐ |
| Launch | ☐ | ☐ | ☐ | ☐ | ☐ |
| Accelerate | ☐ | ☐ | ☐ | ☐ | ☐ |
| Cruise - Low speed | ☐ | ☐ | ☐ | ☐ | ☐ |
| Cruise - Med speed | ☐ | ☐ | ☐ | ☐ | ☐ |
| Cruise - High speed | ☐ | ☐ | ☐ | ☐ | ☐ |
| Decelerate | ☐ | ☐ | ☐ | ☐ | ☐ |
| Momentum | ☐ | ☐ | ☐ | ☐ | ☐ |
| Brake | ☐ | ☐ | ☐ | ☐ | ☐ |

These modes enable motors to always operate in maximum efficiency zone (below rated RPM); thus, increasing the overall system efficiency.

System Configuration 2: Mild Hybrid Electric Vehicle

According an embodiment, a Mild hybrid electric vehicle (MildHEV) consists of EPSs, EPGA, a battery bank, electronic control unit and polyphase motor controller with one or more invertors and/or chargers.

Table 3 below shows various exemplary components and the respective quantity required for this configuration.

TABLE 3

MildHEV components

| Component | Quantity | Specifications |
|---|---|---|
| Multi-Motor System | | |
| Poly phase motor | 2 | 1. 3 phase, 7.5 kW (7.5 kW one hour rating & 20 kW 2 minute rating) 45 VAC induction motor with 4 pole. |
| | | 2. 3 phase, 7.5 kW (7.5 kW one hour rating & 20 kW 2 minute rating) 45 VAC induction motor with 6 pole. |
| Poly phase motor controller | 2 | Nominal battery voltage: 40-80 V |
| | | 2 min. rating: 550 Amps |
| | | 1 hour rating: 155 Amps |
| Energy storage device | 6 | Led acid batteries 120 Ah 48 V |

Now, unlike PHEV, a MildHEV does not have complete electric launch as the number of motors are reduced. The vehicle operation can be divided to reach certain speed in different categories such as launch (0 to 20 kmph), Cruise, Acceleration, Deceleration, Momentum and Braking.

Table 4 shows various indicative modes of operation of engine and one or more motors, according to a state of vehicle.

TABLE 4

Motor operating modes

| Vehicle State | Engine | Motor 1 | Motor 2 |
|---|---|---|---|
| Standstill | ☐ | ☐ | ☐ |
| Launch | ☐ | ☐ | ☐ |
| Cruise - Low speed | ☐ | ☐ | ☐ |
| Cruise - Med speed | ☐ | ☐ | ☐ |
| Cruise - High speed | ☐ | ☐ | ☐ |
| Accelerate | ☐ | ☐ | ☐ |
| Decelerate | ☐ | ☐ | ☐ |
| Momentum | ☐ | ☐ | ☐ |
| Brake | ☐ | ☐ | ☐ |

These modes enable motors to always operate in maximum efficiency zone (below rated RPM); thus, increasing the overall system efficiency.

System Configuration 3: Full Hybrid Electric Vehicle

According to an embodiment, the Full Hybrid electric Vehicle (FullHEV) consists of EPSs, EPGAs, a battery bank, electronic control unit and polyphase controller with one or more invertors.

Table 5 below shows various exemplary components and the respective quantity required for this configuration.

TABLE 5

FullHEV components

| Component | Quantity |
|---|---|
| Multi-Motor System | |
| Poly phase motor | 4 |
| Poly phase motor controller | 4 |
| Motor Integration in the vehicle chassis | 1 |
| Energy storage device | |
| Energy storage device with cell monitoring | 1 |
| Energy management system | 1 |
| Energy storage system integration | 1 |

TABLE 5-continued

FullHEV components

| Component | Quantity |
|---|---|
| Electric Power systems | |
| Electric power gear assembly (EPGA) | 2 |
| Hybrid ECU with Telematics | 1 |
| Wire harness and protection switchgear | |
| Harness | 1 |
| Protection + switchgear | 1 |
| HMI (Mode, Diagnostics, Trips, GPS) | 1 |

FullHEV is operated same as PHEV but with a difference that FullHEV does not require external charging to charge the energy storage system. Instead, it uses vehicles inertia on opportunity basis to charge the energy storage system. The system uses energy generated from one or more vehicle state, from a braking, slowing, down hilling and idle to charge the battery.

In this configuration, the vehicle operation is divided to reach certain speed in different categories such as launch (0 to 20 kmph), Cruise, Acceleration, Deceleration, Momentum and Braking.

At starting from zero speed, all the motors provide torque with engine off state, providing complete electric launch and zero pollution and subsequently motors will be cut off and engine will be brought in as per the need. Table 6 shows various indicative modes of operation of engine and one or motors accordingly to a state of vehicle.

TABLE 6

Motor operating modes

| Vehicle State | Engine | Motor 1 | Motor 2 | Motor 3 | Motor 4 |
|---|---|---|---|---|---|
| Standstill | ☐ | ☐ | ☐ | ☐ | ☐ |
| Launch | ☐ | ☐ | ☐ | ☐ | ☐ |
| Cruise - Low speed | ☐ | ☐ | ☐ | ☐ | ☐ |
| Cruise - Med speed | ☐ | ☐ | ☐ | ☐ | ☐ |
| Cruise - High speed | ☐ | ☐ | ☐ | ☐ | ☐ |
| Accelerate | ☐ | ☐ | ☐ | ☐ | ☐ |
| Decelerate | ☐ | ☐ | ☐ | ☐ | ☐ |
| Momentum | ☐ | ☐ | ☐ | ☐ | ☐ |
| Brake | ☐ | ☐ | ☐ | ☐ | ☐ |

These modes enable motors to always operate in maximum efficiency zone (below rated RPM) increasing overall system efficiency.

System Configuration 4: Electric Vehicle

An embodiment of the present invention describes the Electric Vehicle (EV) consists of EPSs, EPGAs, a battery bank, electronic control unit and polyphase controller with one or more invertors and/or chargers.

Table 7 below shows various exemplary components and the respective quantity required for this configuration.

TABLE 7

EV components

| Component | Quantity |
|---|---|
| Multi-Motor System | |
| Poly phase motor | 4 |
| Poly phase motor controller | 4 |
| Motor Integration in the vehicle chassis | 1 |

TABLE 7-continued

EV components

| Component | Quantity |
|---|---|
| Energy storage device | |
| Energy storage device with cell monitoring | 1 |
| Energy management system | 1 |
| Energy storage system integration | 1 |
| Charger | 1 |
| Electric Power systems | |
| Electric power gear assembly (EPGA) | 2 |
| Hybrid ECU with Telematics | 1 |
| Wire harness and protection switchgear | |
| Harness | 1 |
| Protection + switchgear | 1 |
| HMI (Mode, Diagnostics, Trips, GPS) | 1 |

The vehicle can run up to a maximum speed in EV mode. Beyond this it will run as a range extended mode.

An EV has only electric power available at wheels and no engine power in non-failure mode. In case engine is used, it will be to extend the range beyond the electric energy storage capacity. The difference here with regular range-extended EVs is that the engine is not only used to charge the energy storage system but also to drive the vehicle directly and this will be under failure mode. The charging is also done through vehicles inertia on opportunity basis. The opportunities may be braking, slowing, down hilling or idle.

The energy storage system capacity is not high in this configuration but it provides top-up charge at regular intervals in addition to opportunity basis during deceleration and braking. This significantly reduces the cost of solution as battery capacity is reduced. It also improves the efficiency of the system as dead weight is reduced. In case the energy storage system is not charged, the vehicle can be operated on engine and the system can be operated as mild hybrid electric vehicle by utilizing the regenerated brake energy.

Now, the vehicle operation is divided to reach certain speed in different categories such as launch (0 to 20 kmph), Cruise, Acceleration, Deceleration, Momentum and Braking.

Table 8 shows various indicative modes of operation of engine and one or more motors, according to a state of vehicle.

TABLE 8

Motor operating modes

| Vehicle State | Engine | Motor 1 | Motor 2 | Motor 3 | Motor 4 |
|---|---|---|---|---|---|
| Standstill | ☐ | ☐ | ☐ | ☐ | ☐ |
| Launch | ☐ | ☐ | ☐ | ☐ | ☐ |
| Cruise - Low speed | ☐ | ☐ | ☐ | ☐ | ☐ |
| Cruise - Med speed | ☐ | ☐ | ☐ | ☐ | ☐ |
| Cruise - High speed | ☐ | ☐ | ☐ | ☐ | ☐ |
| Accelerate | ☐ | ☐ | ☐ | ☐ | ☐ |
| Decelerate | ☐ | ☐ | ☐ | ☐ | ☐ |
| Momentum | ☐ | ☐ | ☐ | ☐ | ☐ |
| Brake | ☐ | ☐ | ☐ | ☐ | ☐ |

These modes enable motors to always operate in maximum efficiency zone (below rated RPM) increasing overall system efficiency.

In one embodiment, the system for configuring a vehicle into a hybrid electric vehicle comprises one or more electric power gear assemblies which are configurable to retro-fit the system to the propeller shaft in the existing vehicles such as for hilly terrain. Wherein, a vehicle not equipped with this system can be fitted with EPGA before taking the hilly terrain for extra power boost. In this case, the EPGA will have a modified propeller shaft pre-fitted so as to reduce the assembly time. This will enable removing of the existing propeller shaft and fitting the new propeller shaft with EPGA in no time.

The system described in the present invention increases clutch and engine life as frequent gear changing will not be required and there will not be excessive overloading on the engine. The regeneration of electric power through electric braking i.e. lowering speed through electrical loading provides benefits such as increased clutch life, increased brake shoe and brake drum life, engine life and saving of brake oil.

Although the invention of the system has been described in connection with the embodiments of the present invention illustrated in the accompanying drawings, it is not limited thereto. It will be apparent to those skilled in the art that various substitutions, modifications and changes may be made thereto without departing from the scope and spirit of the invention.

We claim:

1. A retrofit system for converting a vehicle into one of a hybrid electric vehicle or an electric vehicle, the retrofit system comprising:
    an electric power source comprising two or more motors structured to provide a torque to the vehicle;
    one or more attachable electric power gear assemblies structured to couple the two or more motors to a propeller shaft for providing the torque to the vehicle; and
    an electronic control unit coupled to the electric power source and configured to dynamically activate or deactivate each of the two or more motors based on one or more operating conditions of the vehicle;
    wherein a first motor of the two or more motors has at least one of a number of poles or a number of phases different from a second motor of the two or more motors.

2. The system of claim 1, wherein the one or more attachable electric power gear assemblies are configured to connect at least one of the two or more motors in at least one of a perpendicular position or a parallel position to a propeller shaft.

3. The system of claim 1, further comprising an engine management system configured to control a vehicle engine based on a throttle input.

4. The system of claim 1, further comprising one or more motor controllers controlled by the electronic control unit and configured to control at least one of the two or more motors and an amount of power to be extracted from one or more batteries, the one or more controllers configured to provide the torque across a range of operating points of the vehicle.

5. The system of claim 1, wherein the electronic control unit is configured to enable one or more charging units to charge one or more batteries using the braking energy.

6. The system of claim 1, wherein the operating conditions comprise at least one of a required torque, a vehicle operation mode, a vehicle speed, or a vehicle type.

7. The system of claim 1, further comprising a Global System for Mobile (GSM) communications interface configured to transmit information related to the vehicle to a web server, the web server configured to monitor at least one operating condition of the vehicle and a location of the vehicle.

8. The system of claim 1, wherein the electronic control unit determines the required torque by calculating a torque required from one of the two or more motors based on a torque required at the one or more attachable electric power gear assemblies, wherein the torque required at the one or more attachable electric power gear assemblies is calculated based on a torque required at a differential of the vehicle.

9. The system of claim 1, wherein the electronic control unit determines an operation mode of the vehicle based on at least one of:
    a vehicle speed;
    a state of charge of a battery;
    a state of a fault; or
    a position of a mode selection device.

10. The system of claim 1, wherein each of the two or more motors is a polyphase motor and has a number of phases different from the others of the two or more motors.

11. The system of claim 1, wherein the one or more attachable electric power gear assemblies are configured to connect at least one of the two or more motors perpendicularly disposed to the propeller shaft.

12. The system as claimed in claim 11, wherein each of the at least two attachable electric power gear assemblies comprise at least one hypoid profiled crown gear and at least one pinion gear arrangement.

13. The system of claim 1, wherein the one or more attachable electric power gear assemblies are configured to connect the two or more motors to the propeller shaft, wherein at least one of the two or more motors is perpendicular to the propeller shaft through a crown gear of the one or more attachable electric power gear assemblies and another of the two or more motors is parallel to the propeller shaft.

14. The system of claim 1, wherein the one or more attachable electric power gear assemblies are configured to connect at least two propeller shafts joined through universal joints.

15. The system of claim 1, wherein the one or more attachable electric power gear assemblies are configured to connect the two or more motors to the propeller shaft, wherein at least one of the two or more motors is perpendicular to propeller shaft and another of the two or more motors is parallel to the propeller shaft.

16. The system of claim 1, wherein the at least two attachable electric power gear assemblies are configured to connect at least one of the two or more motors parallel to the propeller shaft using drive-driven gears.

17. A hybrid electric vehicle comprising:
    two or more wheels for propelling the vehicle by receiving a torque through a propeller shaft;
    an electric power source comprising two or more motors structured to provide the torque to the vehicle in combination with an engine of the vehicle;
    one or more attachable electric power gear assemblies structured to couple the two or more motors to a propeller shaft for providing the torque to the vehicle;
    an electronic control unit coupled to the electric power source and configured to dynamically activate or deactivate each of the two or more motors based on one or more operating conditions of the vehicle; and
    one or more batteries structured to provide electric energy to the electric power source and one or more electrical devices of the vehicle, said one or more batteries being charged by the electric power source when operated as a generator,
    wherein the one or more attachable electric power gear assemblies are configured to connect at least one of the two or more motors in at least one of a perpendicular position or a parallel position to the propeller shaft; and wherein a first motor of the two or more motors has at least one of a number of poles or a number of phases different from a second motor of the two or more motors.

18. An electric vehicle comprising:

two or more wheels for propelling the vehicle by receiving a torque through a propeller shaft;

an electric power source comprising two or more motors structured to provide the torque to the vehicle;

one or more attachable electric power gear assemblies structured to couple the two or more motors to a propeller shaft for providing the torque to the vehicle;

an electronic control unit coupled to the electric power source and configured to dynamically activate or deactivate each of the two or more motors based on one or more operating conditions of the vehicle; and one or more batteries for providing electric energy to an electric power source and one or more electrical devices of the vehicle, said one or more batteries being charged by the electric power source when operated as a generator, wherein the one or more attachable electric power gear assemblies are configured to connect at least one of the two or more motors in at least one of a perpendicular position or a parallel position to a propeller shaft; and wherein a first motor of the two or more motors has at least one of a number of poles or a number of phases different from a second motor of the two or more motors.

19. The system of claim 17, wherein each of the two or more motors is a polyphase motor and has a number of phases different from the others of the two or more motors.

20. The system of claim 18, wherein each of the two or more motors is a polyphase motor and has a number of phases different from the others of the two or more motors.

* * * * *